(12) United States Patent
Walker (10) Patent No.: US 6,397,184 B1
(45) Date of Patent: May 28, 2002

(54) SYSTEM AND METHOD FOR ASSOCIATING PRE-RECORDED AUDIO SNIPPETS WITH STILL PHOTOGRAPHIC IMAGES

(75) Inventor: Keith A. Walker, Farmington, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 08/738,507

(22) Filed: Oct. 24, 1996

Related U.S. Application Data (60) Provisional application No. 60/025,163, filed on Aug. 29, 1996.

(51) Int. Cl.[7] .............................................. G10L 11/00
(52) U.S. Cl. ........................ 704/270; 704/278; 396/312
(58) Field of Search ................................ 704/201, 270, 704/272, 278; 434/308; 396/311, 312

(56) References Cited

U.S. PATENT DOCUMENTS

| | | | |
|---|---|---|---|
| 3,599,549 A | | 8/1971 | Diuzet ........................ 396/312 |
| 3,970,803 A | | 7/1976 | Kinzie, Jr. et al. ............ 369/64 |
| 4,764,965 A | * | 8/1988 | Yoshimura et al. .......... 704/278 |
| 4,977,419 A | | 12/1990 | Wash et al. .................. 396/311 |
| 4,983,996 A | | 1/1991 | Kinoshita .................... 396/312 |
| 5,057,932 A | * | 10/1991 | Lang .......................... 704/278 |
| 5,059,126 A | | 10/1991 | Kimball ...................... 434/308 |
| 5,276,472 A | | 1/1994 | Bell et al. ................... 396/312 |
| 5,359,698 A | | 10/1994 | Goldberg et al. ........... 704/201 |
| 5,574,519 A | * | 11/1996 | Manico et al. .............. 434/308 |

* cited by examiner

Primary Examiner—David D. Knepper
(74) Attorney, Agent, or Firm—Thomas H. Close (57) ABSTRACT

A system for associating a prerecorded audio snippet with a photograph, includes: an audio data base containing a plurality of audio snippets, each snippet having a corresponding identification code. A scene identification display includes an identification code associated with the scene. A camera having a sensor for sensing the identification code on the display includes a memory for storing the identification code in association with a photograph of the scene taken by the camera. The audio snippet corresponding to the identification code is retrieved from the audio data base and reproduced in conjunction with the display of the photograph.

8 Claims, 5 Drawing Sheets

SYSTEM AND METHOD FOR ASSOCIATING PRE-RECORDED AUDIO SNIPPETS WITH STILL PHOTOGRAPHIC IMAGES

CROSS-REFERENCE TO RELATED APPLICATIONS

The present application is related to U.S. Provisional Application Ser. No. 60/025,163, filed Aug. 29, 1996, by C. S. Bell et al., and entitled, "Image-Audio Print, Method of Making and Player for Using".

FIELD OF THE INVENTION

This invention relates to the field of photography and the creation of audio/visual presentations.

BACKGROUND OF THE INVENTION

The addition of pre-recorded audio to a still photographic image is a cumbersome process which often requires skills in operating audio-visual equipment, i.e. slide projectors, tape recorders, CD players and computers. In order to effectively use each piece of equipment, the operator may be required to have specialized training, knowledge of the technology, creativity and time to learn, setup or program the device. In addition to combining any number of these devices to orchestrate the presentation, creation of the desired audio effects may involve application of sophisticated audio equipment to create and edit audio snippets of an appropriate duration.

The Kodak Portfolio Photo CD system was designed to overcome some of the educational and technical barriers of creating an audio-visual presentation. This system incorporates a Photo CD playback device which outputs scanned images and audio to a standard television. The device is similar to an audio CD player.

A Portfolio Photo CD disc may contain a combination of still images and audio snippets as content. Audio for a Portfolio Photo CD may be recorded at the time an image is taken or could be acquired from a pre-recorded audio source such as an audio CD or magnetic tape. A typical desktop computer is used to run the Portfolio Photo CD application software that provides a user-friendly interface for sequencing still images with audio snippets. The output of this application software is a "script" file which is later used as input, along with the image/audio content, to a Portfolio Photo CD build processor. The output of the build processor is a Portfolio Photo CD disc which contains the content and sequence information for playback of the audio-visual presentation.

When a Portfolio Photo CD disc has been finished, a Photo CD player is used to playback the disc on a standard television. A Portfolio Photo CD disc can also be played on a standard computer having an MPC II compliant CD ROM drive and the appropriate playback software. One drawback of the Portfolio Photo CD system is that once audio is associated with a particular image on CD it can never be changed on that particular CD for that particular image. Another inherent limitation in the Photo CD system is that a transitional delay occurs when displaying images because CD ROM drives are typically slow devices. This transitional delay may be long enough to cause a viewer to lose interest in the presentation.

U.S. Pat. No. 5,059,126 (Kimball) describes a system for associating pre-recorded audio with images by means of a unique bar-code. The bar-code, representing a database index, is printed in the form of a sticker and attached on the page of a book adjacent to the image of a particular bird. The human reader uses an intelligent bar-code reader, a "smart wand", to scan the bar-code sticker. Within the "smart wand", logic is applied to determine an input control signal sent to an audio CD player device. Upon receipt of said control signal, the CD player device plays back the appropriate birdsong audio stored on the compact disc in the player. This method of associating images and audio relies on the proper CD audio disc having been loaded in the CD audio player, and a CD audio player having control means for directing the playback mechanism to playback audio information from a relative location on a compact audio disc.

A system for associating pre-recorded audio and inanimate objects, maps and pictures is described in U.S. Pat. No. 5,359,698, whereby a hand-held device is used to actuate the playback of compressed audio information stored in a random access solid state memory. Bar-codes are utilized to encode index information identifying the audio information associated with an object. The audio information may be uploaded and downloaded to or from an external information system. Whereupon the user has requested narrative audio information by scanning a bar-code pertaining to an object of interest, the audio is read from the solid state random access memory and played back to the user via an audio reproduction means contained in the hand-held device.

Concessionaires located in museums, exhibition halls and national parks, very often sell or rent audio tapes, sometimes available in multiple languages. These pre-recorded tapes provide a visitor narrative descriptions of exhibits or scenery at the location being visited. Playback devices and headsets can usually be rented by the visitor for a nominal fee. DE 3,535,715 describes a system, providing a visitor to an exhibit hall or a museum, a reproduction apparatus that is enabled to interpret exhibit related signal information. The reproduction apparatus, upon receipt of said signal information, converts the signal to audio information pertaining to the exhibit being viewed by the visitor. The visitor actuates the system via a data-connection which automatically requests the relevant audio information for a particular exhibit from a centralized electronic information source. The visitor listens, via a headset, to the audio which is transmitted to the reproduction apparatus through the data-connection. This system allows for the audio reproduction of narrative descriptions in multiple languages.

An example of recording and reproducing image related audio information, captured at the time of exposure, and generating bar-coded information therefrom is described in U.S. Pat. No. 4,983,996. The object of the invention is to provide a means for the recording and subsequent playback of voice annotation for a given photograph. The design of the camera includes a microphone, speaker, pattern converter, voice converter, digital memory, liquid crystal cell and a bar-code reader attachment. Voice input to the camera is converted to a pattern representing a bar-code. The conversion and playback of the bar-coded audio information occurs after the exposed film is processed and printed. The converted voice information is printed from the negative using classical optical printing means. The bar-coded voice information is scanned, using a bar-code reader attachment on the camera, from the photographic print. The signal produced from the bar-code reader is then converted back to audio via a digital data converter residing in the camera and reproduced audibly by a speaker arrangement imbedded in the camera body.

Other methods for associating and/or storing audio information with visual information are described by U.S. Pat. Nos. 3,970,803 and 3,599,549. U.S. Pat. No. 3,970,803 describes a means for the reproduction of audio associated with an image by manual use of an optical scanner passed over printed indicia in a given direction. The use of photo-sensitive material for storing audio information in conjunction with image information is shown in U.S. Pat. No. 3,599,549. Other uses of silver-halide media for recording image related ancillary data include storage of bar-code information, fiducial marks providing scene reference geometry, date/time information and exposure information. There are drawbacks of using the exposure area on silver-halide media for storage of non-image data. The foremost drawback being the disruption of relevant scene information. Other drawbacks are improper and/or unreliable recording and interpretation of the information therefrom and the sacrifice of exposure area which could otherwise be used for maximizing the quantity of images obtained on a given length of film.

SUMMARY OF THE INVENTION

The present invention is directed to overcoming one or more of the problems set forth above. Briefly summarized, according to one aspect of the present invention, a system for associating a prerecorded audio snippet with a photograph, includes an audio data base containing a plurality of audio snippets, each snippet having a corresponding identification code. A scene identification display includes an identification code associated with the scene. A camera having a sensor for sensing the identification code on the display includes a memory for storing the identification code in association with a photograph of the scene taken by the camera. The audio snippet corresponding to the identification code is retrieved from the audio data base and reproduced in conjunction with the display of the photograph.

The advantages of such a system are that the end-user does not need to use a computer, software or other specialized piece of equipment to combine scene relevant audio with a specific photograph. The learning curve for taking a photograph and associating audio with it is minimized, and the enjoyment of photographs can be enhanced by having relevant scene information provided as a service from the photofinisher. Having audio information associated with the photograph is optional and none of the original image area on the print or positive image is lost due to exposing encoded data on the silver-halide portion of the image media itself.

The only user requirements for using the system are having a bar-code reader capable camera, data storage means and a playback device suitable for decoding and playing back the audio information stored to the EEPROM embedded in a sheet attached to the photographic print.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
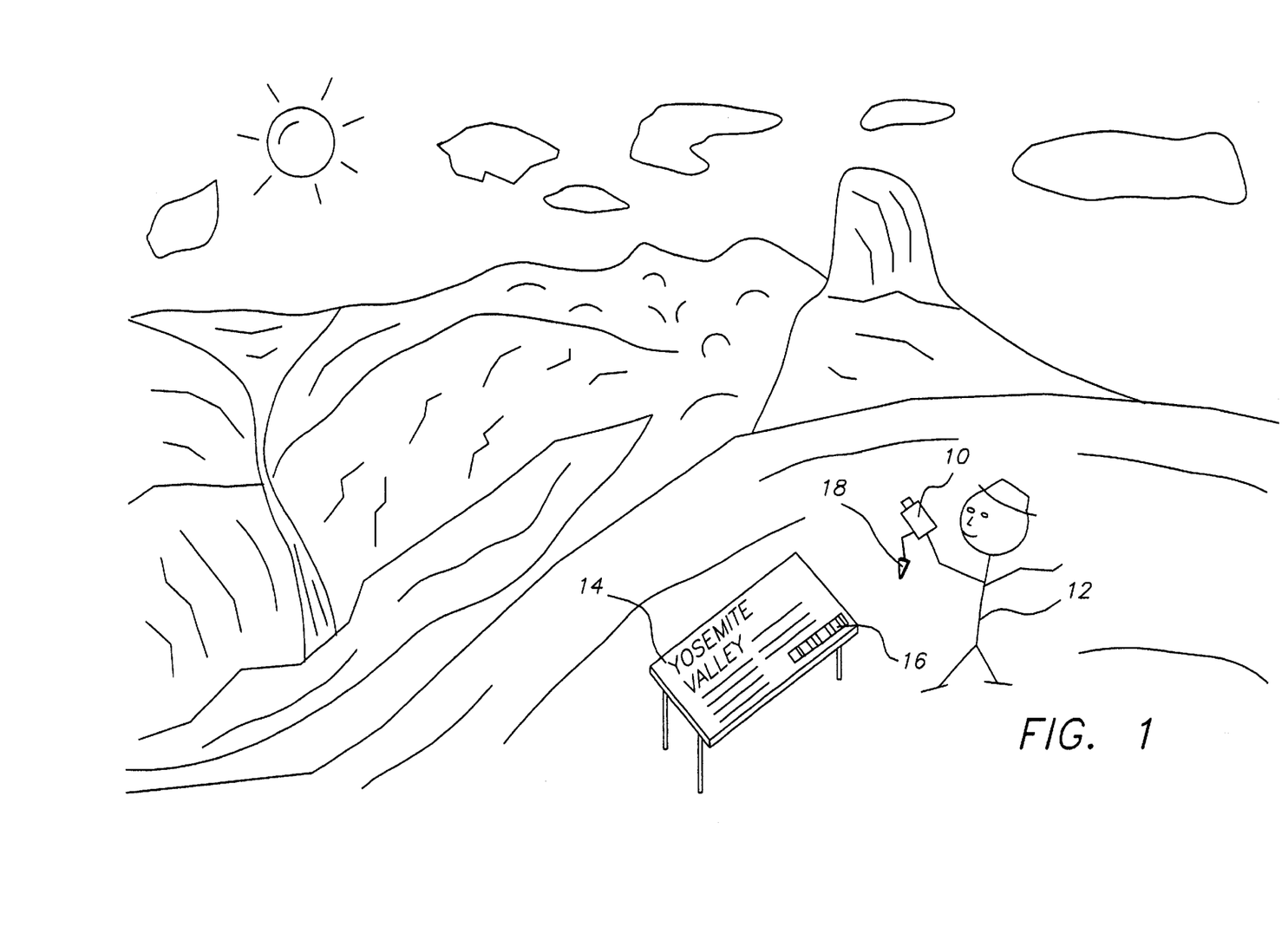
FIG. 1 is a schematic diagram showing a photographer photographing a picturesque scene using the system of the present invention.
Figure 2:
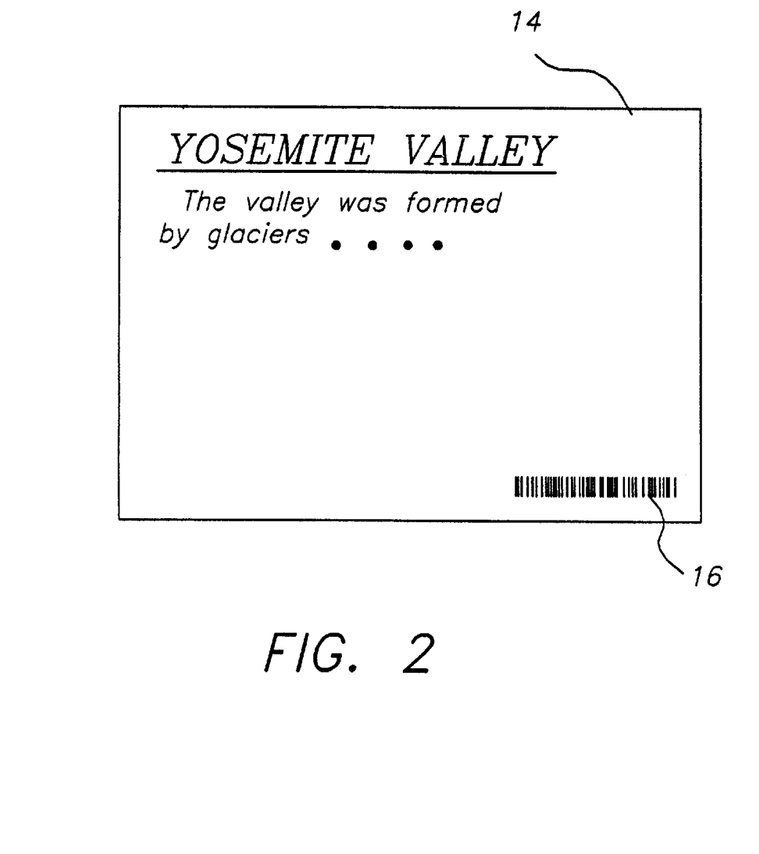
FIG. 2 is an illustration showing an informational display at the scene which describes the scene and provides a bar-code representing a pointer to scene relevant audio information.
Figure 3:
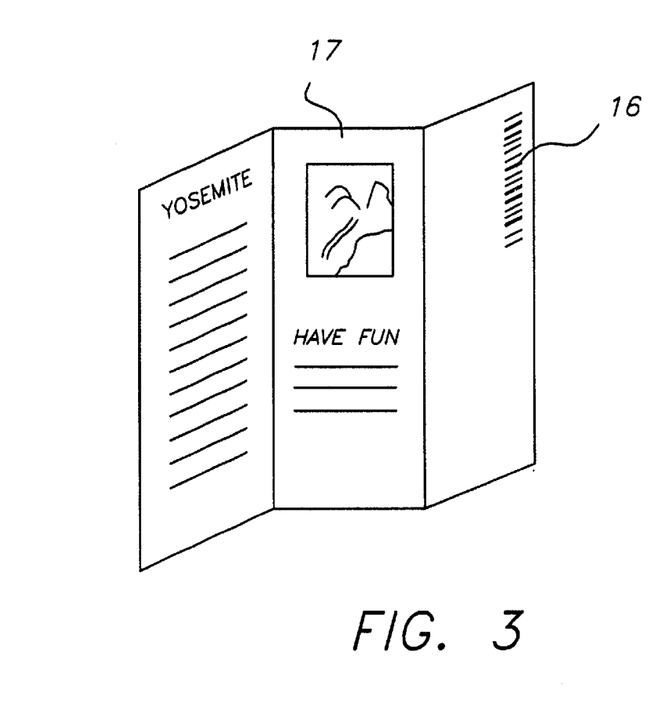
FIG. 3 is an illustration showing an informational brochure with pre-printed scenes, descriptive information and bar-codes representing pointers to scene relevant audio information.

Referring to FIG. 1, the present invention is directed to a system and method for associating pre-recorded audio snippets with still images without sacrificing exposure areas of the image to record the ancillary audio information. Pictures are taken in the usual way with a camera 10 that supports input from a bar-code reader. The camera 10 can be of a traditional silver-halide type or a digital type. At the location from which a photographer 12 takes a picture, an informational display 14 (shown in detail in FIG. 2) exists which provides bar-coded audio reference information 16 which the photographer 12 scans using a bar-code reader attachment 18 connected to the camera 10, as shown in FIG. 1. An alternate means (as shown in FIG. 3) for providing the bar-code information could be in the form of a brochure 17 that the photographer carries while taking pictures. The brochure 17 includes a bar-code 16 similar to that associated with the bar-code at the informational display 14.

The bar-code reference information is essentially a pointer into a database of available audio snippets describing the scene for the photographer. For example, the photographer could be standing on Glacier Point overlooking Yosemite Valley and an informational display 14 provides a written description of the geological features of the valley. Underneath the written description, a bar-code 16 exists which can be scanned by the photographer. The bar-code 16, for example, represents an HTML link on the World Wide Web pointing to a descriptive audio snippet having a verbal description by a geologist from the National Park Service.

Figure 4:
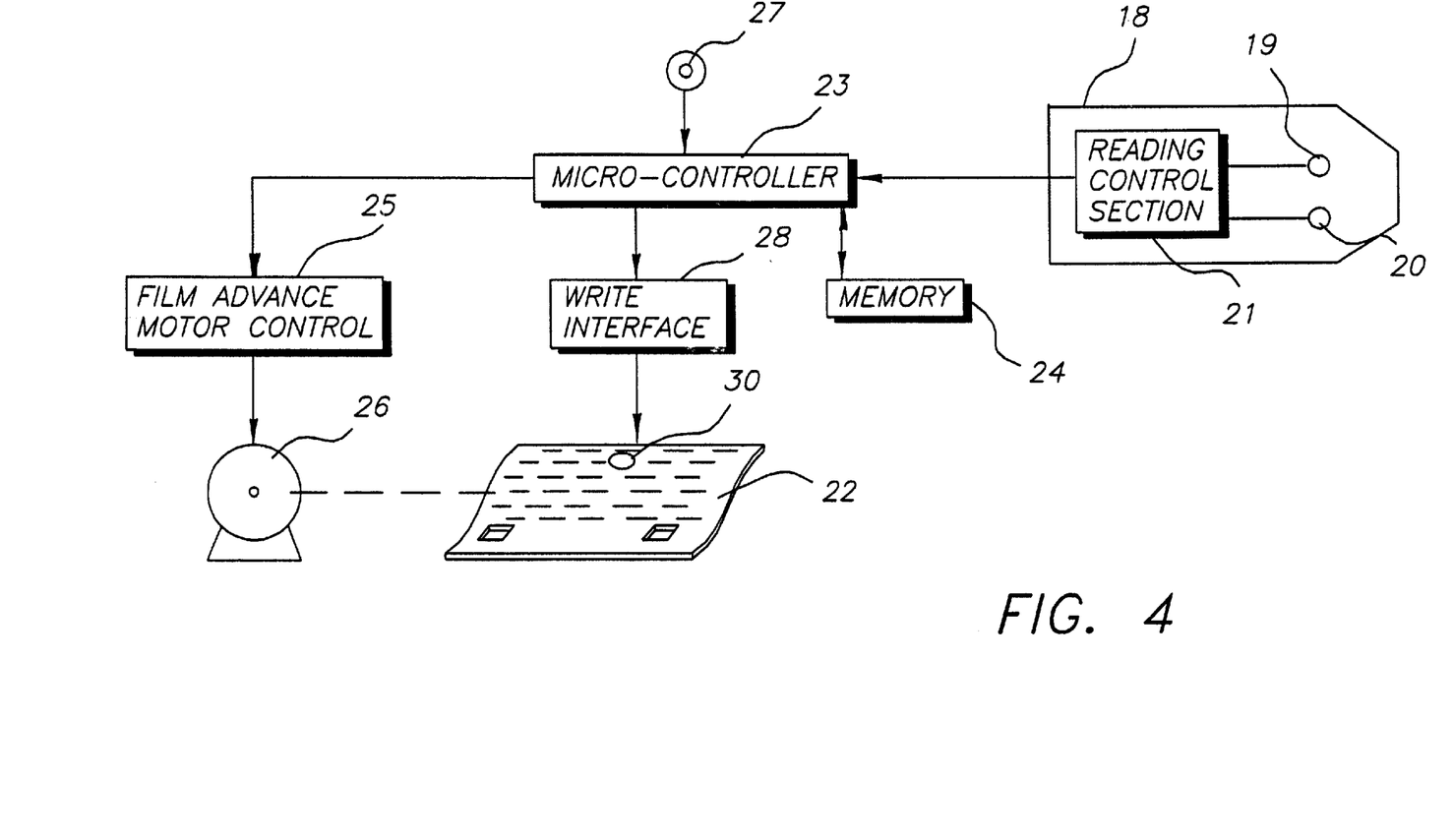
FIG. 4 is a schematic circuit diagram showing the magnetic recording portion of an Advanced Photo System (APS) camera and bar-code wand attachment used in the system of the present invention.

The mechanism for storing barcode information scanned by a photographer will differ depending upon the type of camera and film system the photographer is using. Referring to FIG. 4, in the case of an APS camera 10 and film 22, the bar-code information is stored on the magnetic portion of the film 22. Bar code reader 18 includes a light source 19 and reading sensor 20 and a reading control section 21. The reading sensor 20 serves to read as a series of digital values "1" and "0" the light of the light source 19 which is reflected from the bar code pattern 16 printed on the informational display 14. The reading control section 21 serves to output the series of digital values as a digital signal. The series of digital values are supplied to a camera system microcontroller 23 and are stored in a digital memory 24 connected to the microcontroller 23. The microcontroller 23 is connected to a film advance motor controller 25 for advancing film 22 after an exposure via film advance motor 26. During film advance or rewind, microcontroller 23 retrieves the digitized bar coded information from the digital memory 24 and sends the information to the film write interface circuitry 28 connected to magnetic record head 30 for recording on the track F15 (see U.S. Pat. No. 4,977,419, issued Dec. 11, 1990; to Wash et al.) on the magnetic layer on the film 22. A user input button 27 is provided on the camera to signal the microcontroller 23 that bar code information is about to be read.

In the case of a digital camera, the memory available in such a camera can be used to store the bar-code information. In the case of a traditional silver-halide camera, an additional EEPROM memory card is provided along with appropriate interface circuitry to store the bar-code information.

Figure 5:
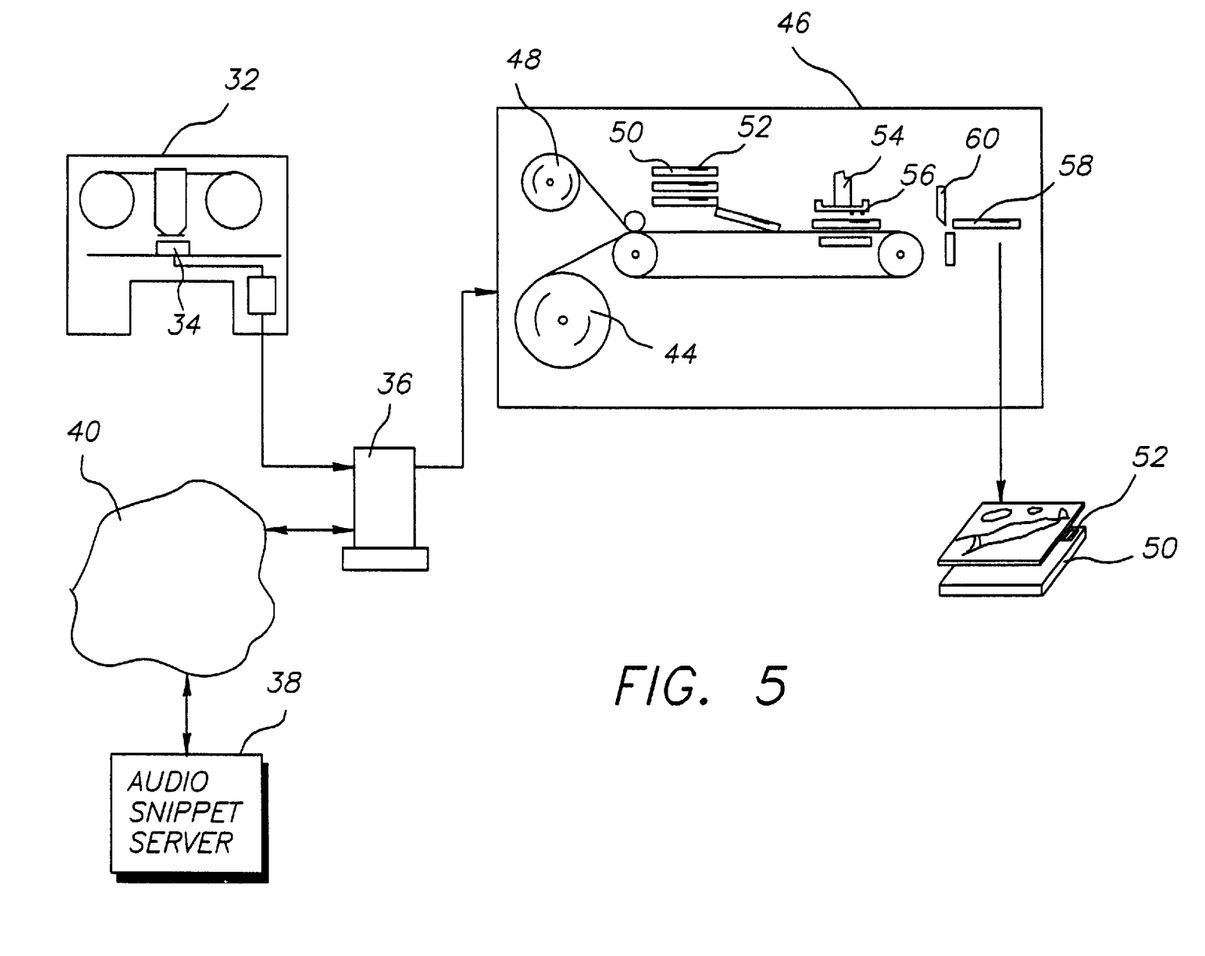
FIG. 5 is a schematic diagram showing photofinishing apparatus for producing a photographic print having an associated EEPROM containing a stored audio snippet according to the present invention.

Referring to FIG. 5, in the case of the APS camera, after the image has been exposed and the bar code information recorded on the film, the film is sent to a photofinishing laboratory where the film 22 is processed and the processed film is sent to a photographic printer 32. The photographic printer 32 is provided with a magnetic reader 34 for reading the bar code information stored on track F15, and any other photofinishing information stored on the film 22. Only the bar-code information is stored on the film or in a memory associated with the camera, not the audio message itself. Given the example that the bar-code represents an HTML link, the photofinishing laboratory's operating computer 36, connected to the photographic printer 32, converts the bar-code information to an HTML string and connects the operating computer 36 to a server 38, containing the audio snippet, on the World Wide Web 40.

During the photofinishing process, a roll of uncut prints 44 is supplied to a lamination station 46. In the lamination station 46, a roll of double sided adhesive tape 48 is supplied to the back of the roll of prints 44. A stack of supports 50, each having an embedded blank EEPROM 52 is provided to the lamination station. The supports 50 are fed one at a time, into position on the moving uncut prints 44, with each support aligned with an uncut print. The audio snippet is retrieved from the memory of the operating computer 36 and a solenoid actuated PROM programmer 54 having programming electrodes 56 performs the dual purpose of programming the EEPROM 52 in each support 50 and applying enough pressure to adhere the support 50 to the back of the roll of prints 44. Finally, the laminated prints 58 are separated by a knife 60 and assembled into an order. The final printed image now has scene relevant audio information stored in an EEPROM 52 that is electrically accessible from the backside of the laminated print 58 for later viewing/listening enjoyment by the photographer.

Figure 6:
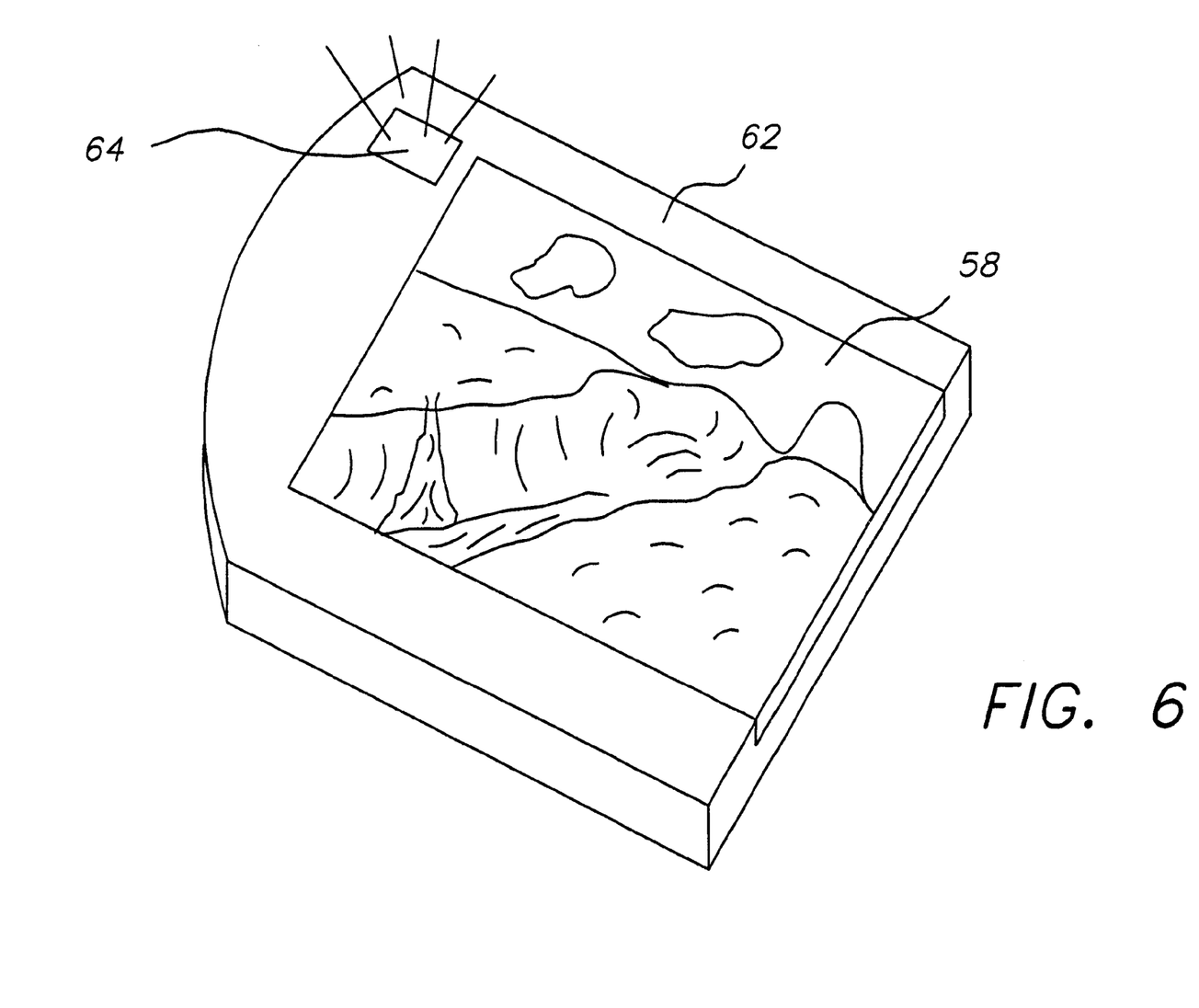
FIG. 6 is a schematic diagram showing a play back device for reproducing the audio snippet stored in the EEPROM associated with the photographic print To facilitate understanding, identical reference numerals have been used, where possible, to designate identical elements that are common to the figures.

The processed order is packaged and sent to the photographer/end-user. Referring to FIG. 6, the end-user is provided with an image-audio playback device 62. The customer, inserts the laminated print 58 into the playback device 62. The playback device 62 reads the audio snippet from the EEPROM 52 embedded in the image-audio support and reproduces the audio information through a built-in speaker 64 in the playback device 62.

The invention has been described with reference to a preferred embodiment. However, it will be appreciated that variations and modifications can be effected by a person of ordinary skill in the art without departing from the scope of the invention.

PARTS LIST 10 camera
12 photographer
14 informational display
16 bar code
17 brochure
18 bar code reader
19 light source
20 reading sensor
21 reading control section
22 film
23 microcontroller
24 digital memory
25 film advance motor controller
26 film advance motor
27 user input button
28 write interface
30 magnetic record head
32 photographic printer
34 magnetic reader
36 operating computer
38 server
40 World Wide Web
44 roll of uncut prints
46 lamination station
48 double sided adhesive tape
50 support
52 EEPROM
54 PROM programmer
56 programming electrodes
58 laminated print
60 knife
62 playback device
64 speaker

What is claimed is:

1. A system for associating a prerecorded audio snippet with a photograph, comprising:

a) an audio data base containing a plurality of audio snippets, each snippet having a corresponding identification code;

b) a scene identification display including an identification code associated with the scene;

c) a camera having a sensor for sensing the identification code on the display and including a memory for storing the identification code in association with a photograph of the scene taken by the camera; and d) means for retrieving the audio snippet corresponding to the identification code and reproducing the audio snippet in conjunction with the display of the photograph.

2. The system claimed in claim 1, wherein the camera is an APS camera, the identification code is stored on a magnetic recording layer on the film in the camera; and the means for retrieving the audio snippet includes a reader for reading the identification code on the film and retrieving the audio from the data base using the identification code retrieved from the film.

3. The system claimed in claim 2, wherein the identification code on the scene identification display is a bar code, and the sensor in the camera is a bar code reader.

4. The system claimed in claim 3, wherein the scene identification display is located at the scene.

5. The system claimed in claim 3, wherein the scene identification display is located in a guide book.

6. The system claimed in claim 1, wherein the camera is a digital camera.

7. The system claimed in claim 1, wherein the identification code is an HTML link pointing to an audio snippet on the World Wide Web.

8. A method for associating a prerecorded audio snippet with a photograph, comprising the steps of:
   a) providing an audio data base containing a plurality of audio snippets, each snippet having a corresponding identification code;
   b) providing a scene identification display including an identification code associated with the scene;
   c) providing a camera having a sensor for sensing the identification code on the display and including a memory for storing the identification code in association with a photograph of the scene taken by the camera; and
   d) retrieving the audio snippet corresponding to the identification code and reproducing the audio snippet in conjunction with the display of the photograph.

* * * * *

UNITED STATES PATENT AND TRADEMARK OFFICE
CERTIFICATE OF CORRECTION

PATENT NO. : 6,397,184 B1 Page 1 of 1
DATED : May 28, 2002
INVENTOR(S) : Walker, Keith A.

It is certified that error appears in the above-identified patent and that said Letters Patent is hereby corrected as shown below:

Title page,
Item [*] Notice, delete "0" and insert -- 678 --.

Signed and Sealed this

Twenty-third Day of August, 2005

JON W. DUDAS
*Director of the United States Patent and Trademark Office*